(12) United States Patent
Soucheleau

(10) Patent No.: US 8,128,039 B2
(45) Date of Patent: Mar. 6, 2012

(54) AERODYNAMIC SURFACE ASSEMBLY FOR AIRCRAFT

(75) Inventor: Bertrand Soucheleau, La Salvetat Saint Gilles (FR)

(73) Assignee: Airbus Operations SAS, Toulouse (FR)

( * ) Notice: Subject to any disclaimer, the term of this patent is extended or adjusted under 35 U.S.C. 154(b) by 442 days.

(21) Appl. No.: 12/413,959

(22) Filed: Mar. 30, 2009

(65) Prior Publication Data

US 2009/0250558 A1 Oct. 8, 2009

(30) Foreign Application Priority Data

Apr. 2, 2008 (FR) .................................. 08 01822

(51) Int. Cl.
*B64D 3/50* (2006.01)
(52) U.S. Cl. .................................................. 244/215
(58) Field of Classification Search ................ 244/201, 244/210, 212, 213, 215–217
See application file for complete search history.

(56) References Cited

U.S. PATENT DOCUMENTS

| | | | |
|---|---|---|---|
| 2,239,475 A | 4/1941 | Weick | |
| 2,281,696 A | 5/1942 | Johnson | |
| 2,551,495 A | 5/1951 | Lambert | |
| 2,603,436 A | 7/1952 | Mellinger | |
| 2,630,988 A | 3/1953 | Pribil | |
| 3,790,106 A * | 2/1974 | Sweeney et al. | 244/203 |
| 3,910,530 A * | 10/1975 | James et al. | 244/214 |
| 4,285,482 A * | 8/1981 | Lewis | 244/207 |
| 4,995,575 A * | 2/1991 | Stephenson | 244/216 |
| 5,207,400 A * | 5/1993 | Jennings | 244/216 |
| 5,538,202 A * | 7/1996 | Thornburg | 244/215 |
| 6,109,567 A * | 8/2000 | Munoz Saiz | 244/215 |
| 7,510,150 B2 * | 3/2009 | Williams et al. | 244/211 |
| 7,766,282 B2 * | 8/2010 | Kordel et al. | 244/215 |

FOREIGN PATENT DOCUMENTS

| | | |
|---|---|---|
| GB | 491 538 | 9/1938 |
| WO | 01/05654 | 1/2001 |

OTHER PUBLICATIONS

Preliminary Search Report dated Nov. 12, 2008 w/ English translation.

* cited by examiner

*Primary Examiner* — Richard Price, Jr.
(74) *Attorney, Agent, or Firm* — Dickinson Wright PLLC

(57) ABSTRACT

Disclosed is a set of aerodynamic surfaces for an aircraft. There is included in the set a fixed aerodynamic surface delimited by two external walls which, at the rear, converge toward one another. A mobile flap extends the external walls, forming a mobile trailing-edge. An actuator is positioned so as to cause the mobile flap to rotate. A vane runs in the overall direction of the span of the fixed aerodynamic surface, and rotates with the flap.

6 Claims, 2 Drawing Sheets

AERODYNAMIC SURFACE ASSEMBLY FOR AIRCRAFT

FIELD OF THE INVENTION

The present invention relates to a set of aerodynamic surfaces for an aircraft, and to an aircraft comprising at least one such set of aerodynamic surfaces.

BACKGROUND OF THE INVENTION

It is known that a fixed aerodynamic surface of an aircraft (such as a wing, a horizontal stabilizer or a vertical stabilizer) is extended at the rear by at least one mobile flap (such as an aileron, an elevator, a rudder, etc.) able to form a mobile trailing-edge part for said aerodynamic surface.

It is also known that such mobile flaps are controlled by actuators mounted on the fixed aerodynamic surfaces. Of course, said actuators have to be designed for the forces they need to develop in order to move said flaps, it being necessary for these forces to overcome the aerodynamic forces applied to said flaps. Because these flaps can rotate, these aerodynamic forces generate, with respect to the hinge of said flaps, a resistive moment generally known as a "hinge moment".

However, because said actuators are heavy components, they have to be specified just sufficient to do the job in order to limit the mass of the aircraft, and this means that the hinge moment has to be known with accuracy.

Furthermore, in a new aircraft development program, said actuators have to be defined very early on because they themselves undergo a lengthy development process. Now, hinge moments of an aircraft under development are not only difficult to predict with sufficient preciseness for the actuators to be specified optimally, but also vary greatly with changes in the geometry of the aircraft during the development process.

Hence, in practice, margins of safety are created in the specifying of said actuators so as to guarantee that the flaps will work in spite of the uncertainties in prediction and the possible variations in geometry. As a result, the actuators are always overspecified.

In an attempt to remedy the aforementioned disadvantages, proposals have already been made for external trailing-edge tabs to be arranged on control surfaces, these working by modifying the shape of said control surfaces. Such external tabs are detrimental to the aerodynamic performance of the aircraft because they increase the drag. In addition, the compensation they afford has constantly to be adjusted according to the phase of flight or the angle of the control surfaces. Furthermore, these external tabs are located at the trailing edge of the control surfaces and therefore add additional weight making said control surfaces sensitive to aerostatic flutter.

Elsewhere, document U.S. Pat. No. 2,630,988 already discloses a set of aerodynamic surfaces for aircraft, comprising at least:
- one fixed aerodynamic surface delimited by two external walls which, at the rear, converge toward one another and between which a spar is positioned, said external walls and said spar delimiting a box section that is open to the rear and runs in the overall direction of the span of said fixed aerodynamic surface;
- a mobile flap, the front part of which is articulated about an axis of rotation with respect to said fixed aerodynamic surface and which extends said external walls, thereby forming a mobile trailing-edge part for said fixed aerodynamic surface;
- actuating means, housed in said box section and able to cause said mobile flap to rotate; and
- a vane, positioned in that part of said box section that is free of said actuating means and on the opposite side of said axis of rotation to said flap, said vane rotating as one with said flap and running in the overall direction of the span of said fixed aerodynamic surface, said vane dividing said box section into two chambers at least substantially isolated from one another and each comprising one of said external walls.

In a set of aerodynamic surfaces such as this, each chamber is in pressure-wise communication with the aerodynamic flow over the corresponding external wall of said box structure via the slot that there is by design between the rear part of said fixed aerodynamic surface and said mobile flap.

Thus, in theory, said vane is subjected to a pressure differential similar to the one applied to said flap and, because it is positioned on the opposite side of the axis of rotation therefrom, it generates an antagonistic moment opposing the hinge moment, thus decreasing the latter accordingly.

However, experience has shown that said pressure communication slot is unable, at said vane, to guarantee a pressure differential that can actually be used to generate such an antagonistic moment able optimally to oppose the hinge moment.

SUMMARY OF THE INVENTION

It is therefore an object of the present invention to overcome this disadvantage by providing self-adaptive compensation that is directly proportional to the aerodynamic forces that give rise to the hinge moment.

To this end, according to the invention, the set of aerodynamic surfaces of the type recalled hereinabove comprises, in each external wall of said mobile flap, at least one pressure tapping able to place the corresponding chamber in pressure-wise communication with the aerodynamic flow over the corresponding external wall of said box section.

These pressure tappings may be distributed along the chord of the flap and connected to said chambers via ducts in said mobile flap. The location and number of said pressure tappings are determined so that irrespective of the location at which a pressure variation liable to alter the hinge moment occurs, this variation is transmitted to the corresponding chamber. Presetable nonreturn valves may possibly be provided in said ducts, in order best to regulate the pressure differential applied to said vane.

Thus, across the vane, there is a pressure differential proportional to the differential between the external walls of the flap. This pressure differential leads to the creation of a hinge moment antagonistic to that of the flap. There is therefore an overall reduction in the force that the actuator needs to develop and the level of reduction can easily be evaluated because it is in direct proportion:
- to the ratio of surface areas between the vane and the flap, and
- to any possible setting of the device that controls the pressure differential.

It must be noted that the present invention:
- does not affect the external lines of the aircraft, or the performance thereof;
- concentrates the added mass forward of the axis of articulation of the flap, thus encouraging static balancing thereof and contributing to the reduction in flutter;
- makes it possible to reduce the magnitude of the hinge moments, resulting in a reduction in the size of the actuators; and allows the hinge moments to be tailored to the capability of the actuators, thus guaranteeing that the flaps will work even if there is a change in the magnitude of the hinge moment.

In order to provide relative pressure-wise isolation between the two chambers of the box section while at the same time allowing the flap-vane assembly to rotate freely about said axis of rotation, it is advantageous:

for the front edge of said vane to be straight and parallel to said axis of rotation of the flap, for that face of said spar that faces toward said flap to be cylindrical about said axis of rotation of said flap, and for said front edge of the vane to be in sealed sliding contact with said cylindrical face; and for the lateral edges of said vane to be straight and orthogonal to said axis of rotation of said flap, for said box section to comprise flat partitions orthogonal to said axis of rotation, and for said lateral edges of the vane to be in sealed sliding contact with such flat partitions.

The present invention also relates to an aircraft comprising at least one such set of aerodynamic surfaces as specified hereinabove.

BRIEF DESCRIPTION OF THE DRAWINGS

The figures of the attached drawing will make it easy to understand how the invention may be embodied. In these figures, identical references denote elements that are similar.

DETAILED DESCRIPTION OF THE INVENTION

Figure 1:
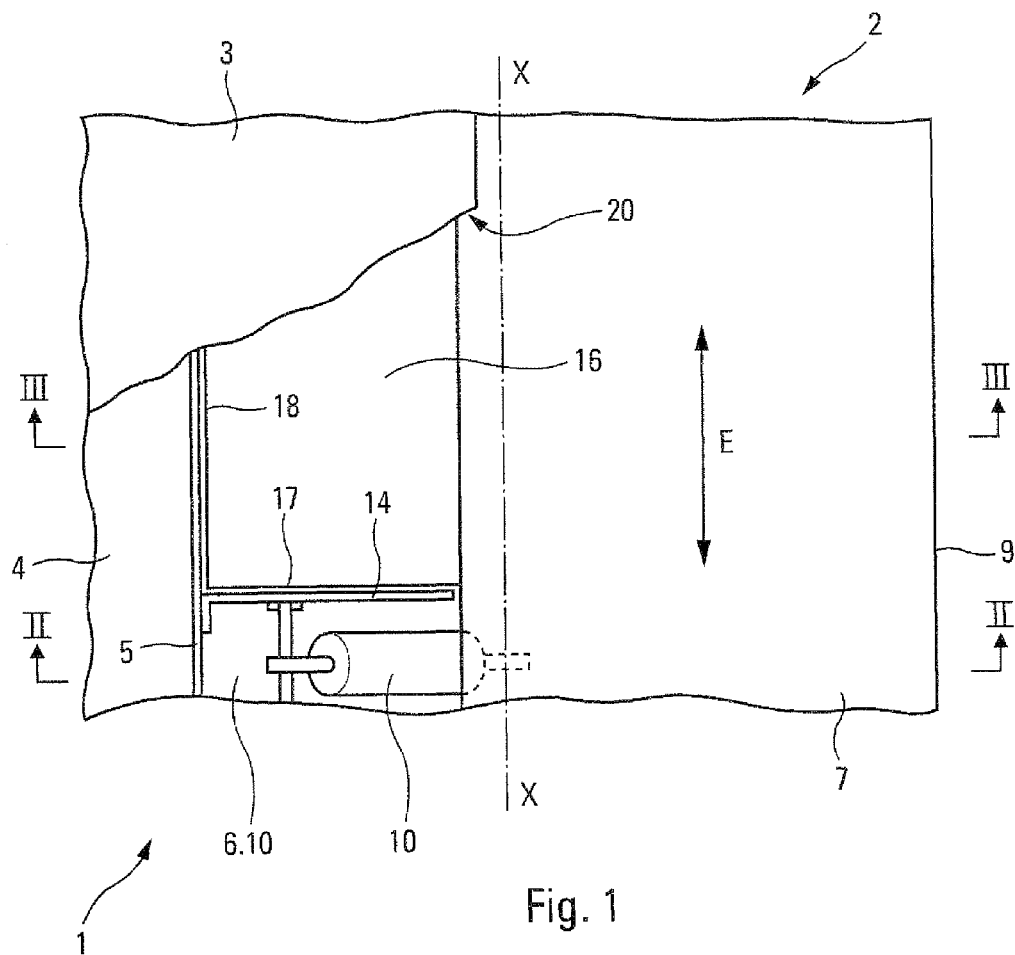
FIG. 1 is a schematic and partial plan view, with cutaway, of the rear part of a fixed aerodynamic surface provided with a mobile flap, the latter comprising a vane according to the provisions of the present invention.
Figure 2:
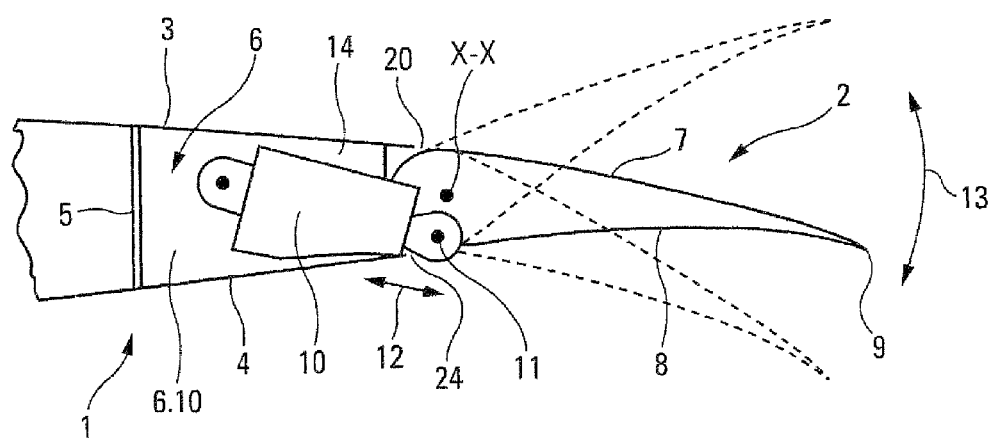
FIGS. 2 and 3 are schematic sections on II-II and III-III of FIG. 1, respectively.
Figure 3:
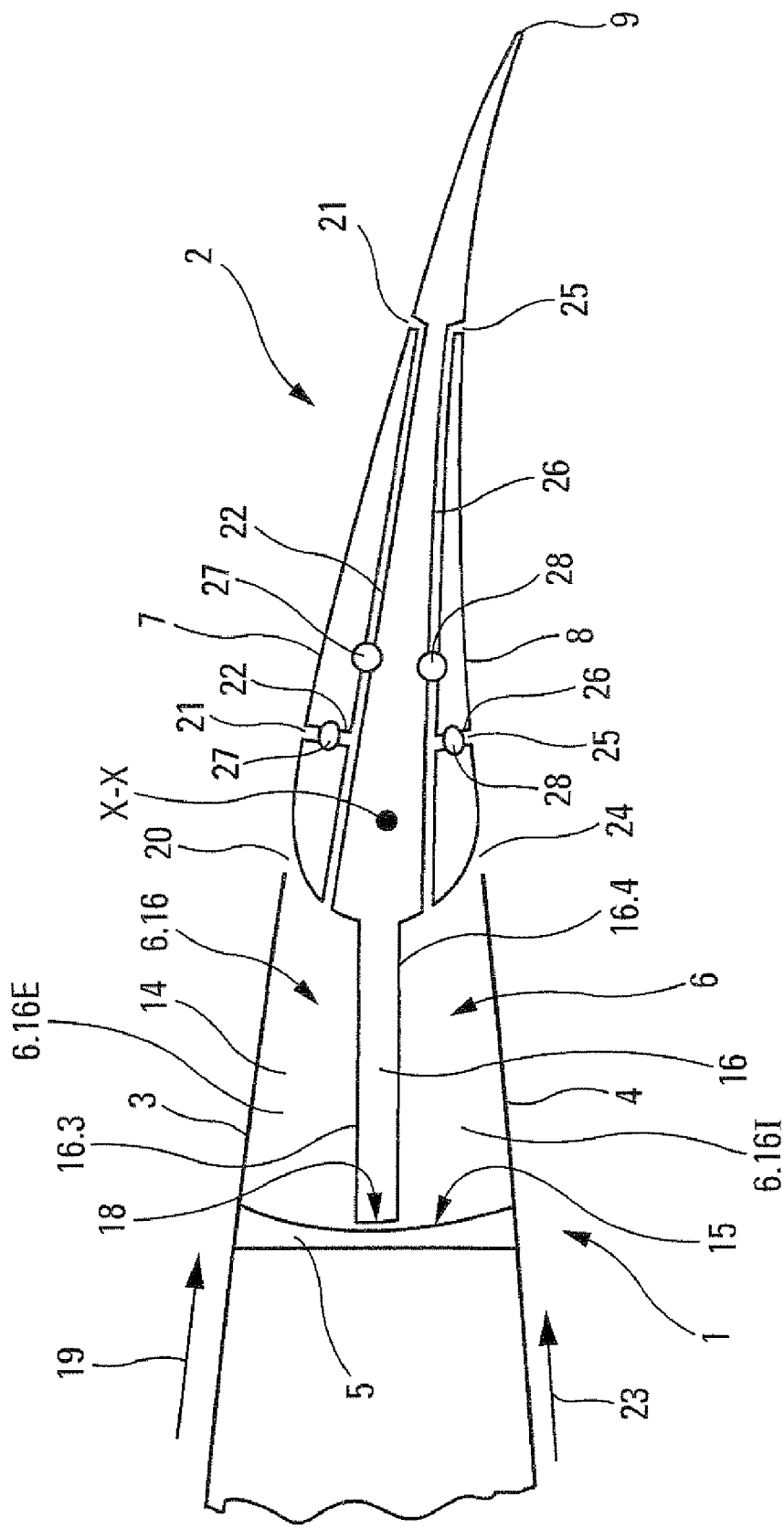

The exemplary embodiment of the invention, illustrated in FIGS. 1 to 3, depicts the rear part of a fixed aerodynamic surface 1, which may be a wing or horizontal stabilizer, and a mobile flap 2, which may be a control surface controlling roll (an aileron) or an elevator. It will be understood, from reading that which follows, that the embodiment of FIGS. 1 to 3 is merely one exemplary embodiment and that the present invention can be applied mutatis mutandis to some other type of aerodynamic surface and mobile flap, for example to a vertical stabilizer and its rudder.

The rear part of the fixed aerodynamic surface 1 is delimited by external walls 3 and 4 which converge toward one another toward the rear and between which there is positioned a spar 5. In the example depicted, the external walls 3 and 4 correspond respectively to the extrados and to the intrados of said fixed aerodynamic surface. The external walls 3 and 4 and the spar 5 delimit a box section 6 open toward the rear and running in the overall direction of the span E of said fixed aerodynamic surface.

Via its front part, the mobile flap 2 is articulated for rotation about an axis of rotation X-X with respect to said rear part of the fixed aerodynamic surface 1, the axis X-X having the overall direction of the span E.

The mobile flap 2 comprises an external wall 7 and an external wall 8 which respectively extend the external walls 3 and 4 of said rear part 1 of the fixed aerodynamic surface. The external walls 7 and 8 converge toward one another to form a trailing edge 9. This trailing edge 9 of the flap 2 therefore forms a mobile trailing edge part for said fixed aerodynamic surface 1.

Housed inside the box section 6 are actuating means 10, articulated to said flap 2 at 11 and able to cause this flap to rotate about the axis X-X as symbolized in FIG. 2 by the double-headed arrows 12, 13 and by the positions of said flap 2 shown in dotted line.

The part 6.10 of the box section 6 in which the actuating means 10 are located is delimited by one of the flat partitions 14, orthogonal to the axis of rotation X-X, provided inside said box section 6.

Furthermore, that face 15 of the part of the spar 5 that lies facing the flap 2 and is positioned in the part 6.16 of the box section 6, outside of the part 6.10 thereof, is cylindrical about the axis of rotation X-X.

Positioned in said part 6.16 of the box section 6 is a vane 16 secured to the forward part of said flap 2, so that it rotates as one therewith. The vane 16 lies on the opposite side of the axis of rotation X-X to the flap 2 and runs in the overall direction of the span E of said fixed aerodynamic surface.

The vane 16 has an at least approximately rectangular shape and its straight lateral edges 17 (which are orthogonal to the axis X-X) lie, in a way that has not been depicted, in sealed sliding contact with respective flat walls 14. In addition, the front edge 18 of the vane 16 (which is straight and parallel to the axis X-X) is also in sealed sliding contact (in a way that has not been depicted) with the cylindrical face 15 of the spar 5.

Thus, the vane 16 divides the part 6.16 of the box section 6 into two chambers 6.16E and 6.16I which are substantially isolated from one another and which remain so as the flap 2 rotates about its axis of rotation X-X, whereas their volumes vary in opposite directions as a result of the concomitant rotation of said vane 16.

The chamber 6.16E lies on the same side as the external walls 3 and 7 and is in pressure-wise communication with the aerodynamic flow 19 flowing over these external walls, by virtue of the slot 20 that separates said external walls 3 and 7. One or a plurality of pressure tappings 21 are also provided in the external wall 7 of the flap 2, at least one duct 22 being made in said flap to place the chamber 6.16E in communication with each of said pressure tappings 21. Thus, the same pressure is applied to the face 16.3 of the vane 16 that faces toward the external wall 3 as is applied to the external wall 7 of the flap 2.

The chamber 6.16I is positioned on the same side as the external walls 4 and 8 and is in pressure-wise communication with the aerodynamic flow 23 20 flowing over these external walls by virtue of the slot 24 that separates said external walls 4 and 8. One or a plurality of pressure tappings 25 are also provided in the external wall 8 of the flap 2, at least one duct 26 being made in said flap in order to place the chamber 6.16I in communication with each of said pressure tappings 25. Thus, the same pressure is applied to the face 16.4 of the vane 16 that faces toward the external wall 4 as is applied to the external wall 8 of the flap 2.

Presetable nonreturn valves 27 and 28 may be provided in the ducts 22 and 26 respectively, in order best to regulate the pressure differential applied to said vane 16.

From the foregoing, it will therefore have been readily understood that the vane 16 and the flap 2 are submitted to the same pressure differential and generate opposing moments about the axis X-X.

As a result, the force that the actuating means 10 have to provide in order to cause the flap 2 to turn is smaller and the magnitude of the antagonistic moment generated by the vane 16 can be adjusted by varying the surface area of this vane.

The invention claimed is:

1. A set of aerodynamic surfaces for aircraft, comprising at least:
   one fixed aerodynamic surface delimited by two external walls which, at the rear, converge toward one another and between which a spar is positioned, said external walls and said spar delimiting a box section that is open to the rear and runs in the overall direction of the span of said fixed aerodynamic surface;
   a mobile flap, the front part of which is articulated about an axis of rotation with respect to said fixed aerodynamic surface and which extends said external walls, thereby forming a mobile trailing-edge part for said fixed aerodynamic surface;
   actuating means, housed in said box section and able to cause said mobile flap to rotate;
   a vane, positioned in that part of said box section that is free of said actuating means and on the opposite side of said axis of rotation to said flap, said vane rotating as one with said flap and running in the overall direction of the span of said fixed aerodynamic surface, said vane dividing said box section into two chambers at least substantially isolated from one another and each comprising one of said external walls; and
   in each external wall of said mobile flap, at least one pressure tapping able to place the corresponding chamber in pressure-wise communication with the aerodynamic flow over the corresponding external wall of said box section.

2. The set as claimed in claim 1, in which said pressure tappings are connected to said corresponding chamber via ducts arranged in said mobile flap.

3. The set as claimed in claim 2, in which presetable non-return valves are provided in said ducts.

4. The set as claimed in claim 1, in which the front edge of said vane is straight and parallel to said axis of rotation of the flap, that face of said spar that faces toward said flap is cylindrical about said axis of rotation of said flap, and said front edge is in sealed sliding contact with said cylindrical face.

5. The set as claimed in claim 1, in which the lateral edges of said vane are straight and orthogonal to said axis of rotation of said flap, said box section comprises flat partitions orthogonal to said axis of rotation, and said lateral edges are in sealed sliding contact with such flat partitions.

6. An aircraft, which comprises at least one set of aerodynamic surfaces like that specified in claim 1.

* * * * *